June 1, 1926.

F. B. THOMPSON 1,587,051

PHOTOGRAPHIC FILM TREATING APPARATUS

Filed Feb. 9, 1924  3 Sheets-Sheet 1

Inventor
Fredrick B. Thompson

Lyon & Lyon
Attorney

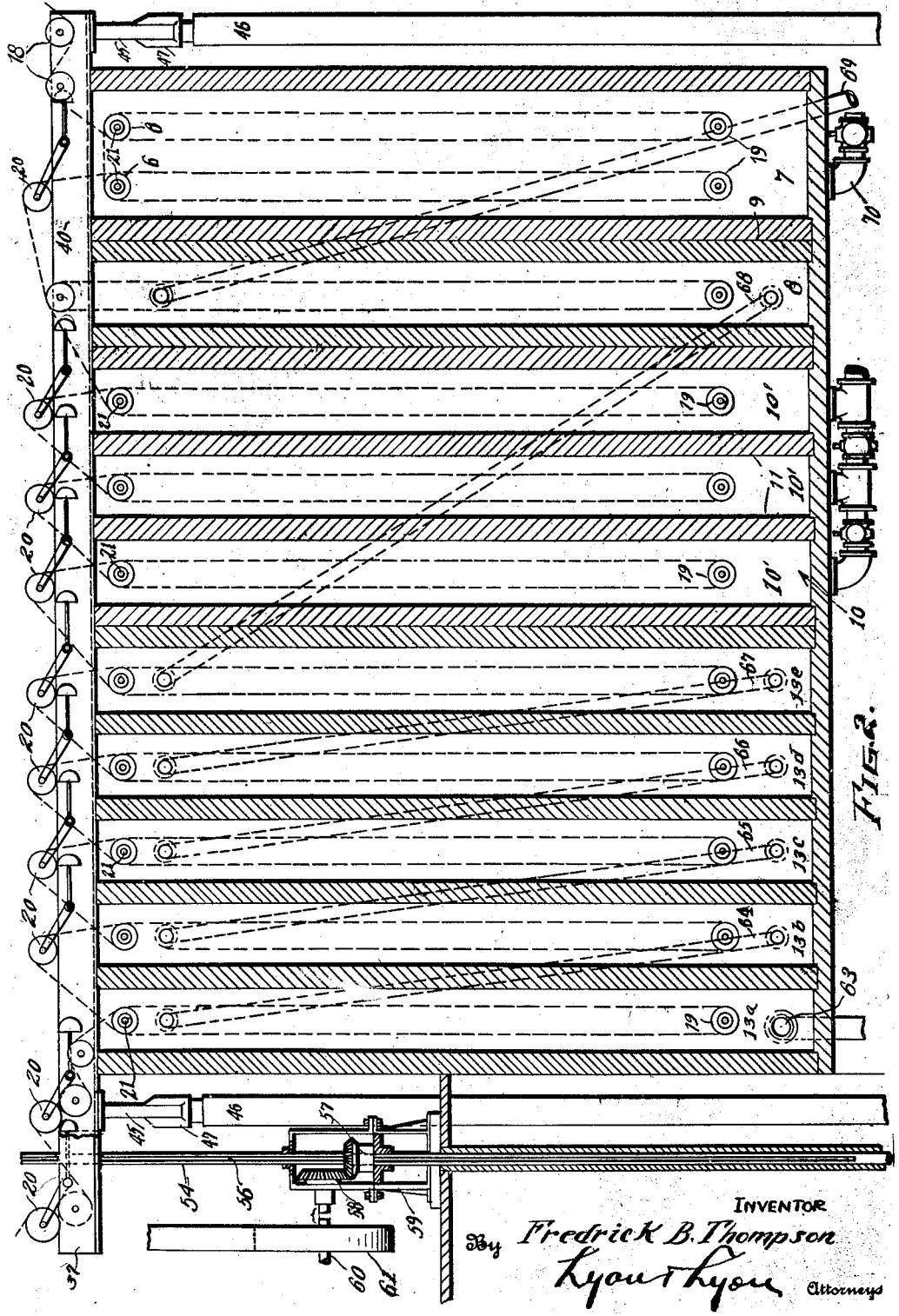

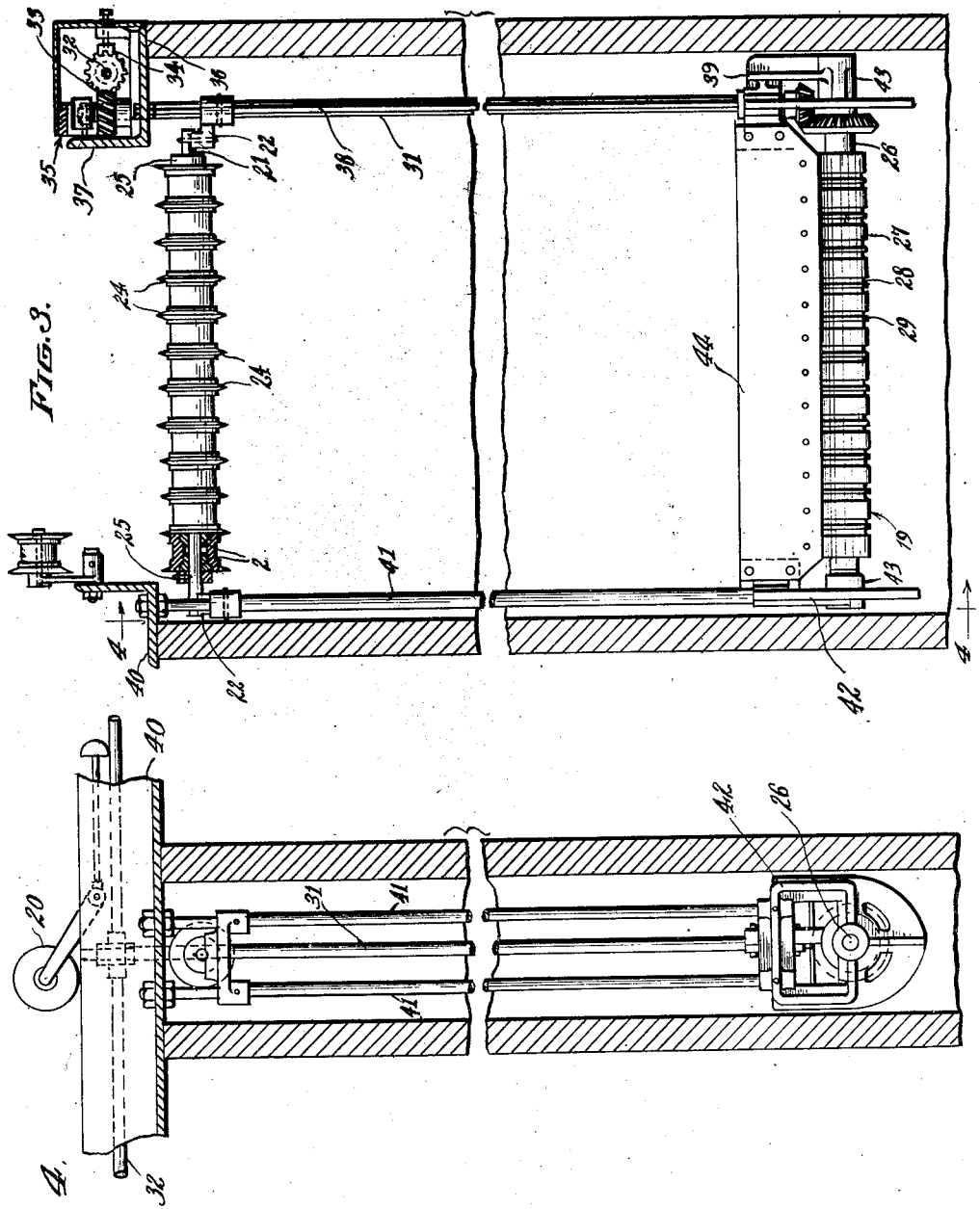

Patented June 1, 1926.

1,587,051

UNITED STATES PATENT OFFICE.

FREDRICK B. THOMPSON, OF LOS ANGELES, CALIFORNIA.

PHOTOGRAPHIC-FILM-TREATING APPARATUS.

Application filed February 9, 1924. Serial No. 691,634.

This invention relates to an apparatus for the developing and fixing of photographic films of that kind used for the projection of motion pictures, and is more particularly directed to an improved means of causing the photographic film tape to travel through tanks containing a developing solution, rinsing water, a fixing solution, and subsequently through a series of tanks containing wash water.

Photographic films made of semi-transparent or translucent material (such as used in taking and for projecting motion pictures) are not of great tensile strength and are likewise easily torn. Machines constructed for the automatic development of these film tapes have, for the most part, proved to be unsatisfactory, the reason for which may be that the film, when immersed in these liquids and solutions, expands, and on subsequent drying of the liquid again contracts to its former length. Machines have been constructed that employ a carrier ribbon threaded through the apparatus for carrying the film; however these photographic films are easily scratched and blurred, especially when wet, so that these machines, while operative, have many disadvantages which it is the object of this invention to overcome.

The complete apparatus for developing photographic films comprises a drying unit in combination with this developing, fixing and washing unit. This application deals with the latter unit, while the former unit, the "drying end", is the subject of my co-pending application filed February 9, 1924, Serial No. 691,633.

It is to be understood that the units employed in this apparatus are variable in size and shape and, with a unit as disclosed in this application, I have discovered that I am able to develop between five thousand and seven thousand linear feet of photographic film tape per hour, the rate being for the most part dependent on the condition of the air admitted into the drying chamber.

An object of this invention may be to provide a photographic film treating apparatus which will speedily accurately and perfectly develop, rinse, fix and wash photographic film tape.

An object of this invention may be to provide a photographic film processing apparatus in which photographic films are developed using a minimum of the expensive chemicals.

An object of this invention may be to provide a photographic film processing apparatus in which the film tape is driven, having the film tape rollers adapted to compensate for the change of length of the film.

An object of this invention may be to provide an apparatus for developing film tape in which the film carriage units are removable from the liquid tanks in order to repair a broken film or to repair the carriage without removal or loss of the solutions from their respective tanks.

An object of this invention may be to provide an apparatus for developing film tape having tanks so adapted that the water used for washing the film tape runs counter-current to the travel of the film.

Other objects and advantages of this invention will be apparent from the following detailed description of a preferred embodiment of this invention, of which embodiment the accompanying drawings are a part.

In the drawings, similar numbers and figures refer to similar parts:

Fig. 2 is an enlarged sectional side elevation of the liquid tanks shown in Figure 1, illustrating the drive mechanism embodied in this invention, the guiding means for the suspension of the film carriage in the tanks, as well as the piping for the counter-current flow of the wash water through the washing and rinsing tanks.

Fig. 3 is an end elevation of this film sensitizing apparatus taken on the line 3—3 of Figure 1, showing a means for driving a set of rollers to impart motion to the film tape.

Fig. 4 is a sectional side elevation taken on the line 4—4 of Figure 3, showing one unit of the film carriage apparatus embodied in this invention and illustrating a means of holding the bottom rollers in suspension.

Figure 1:
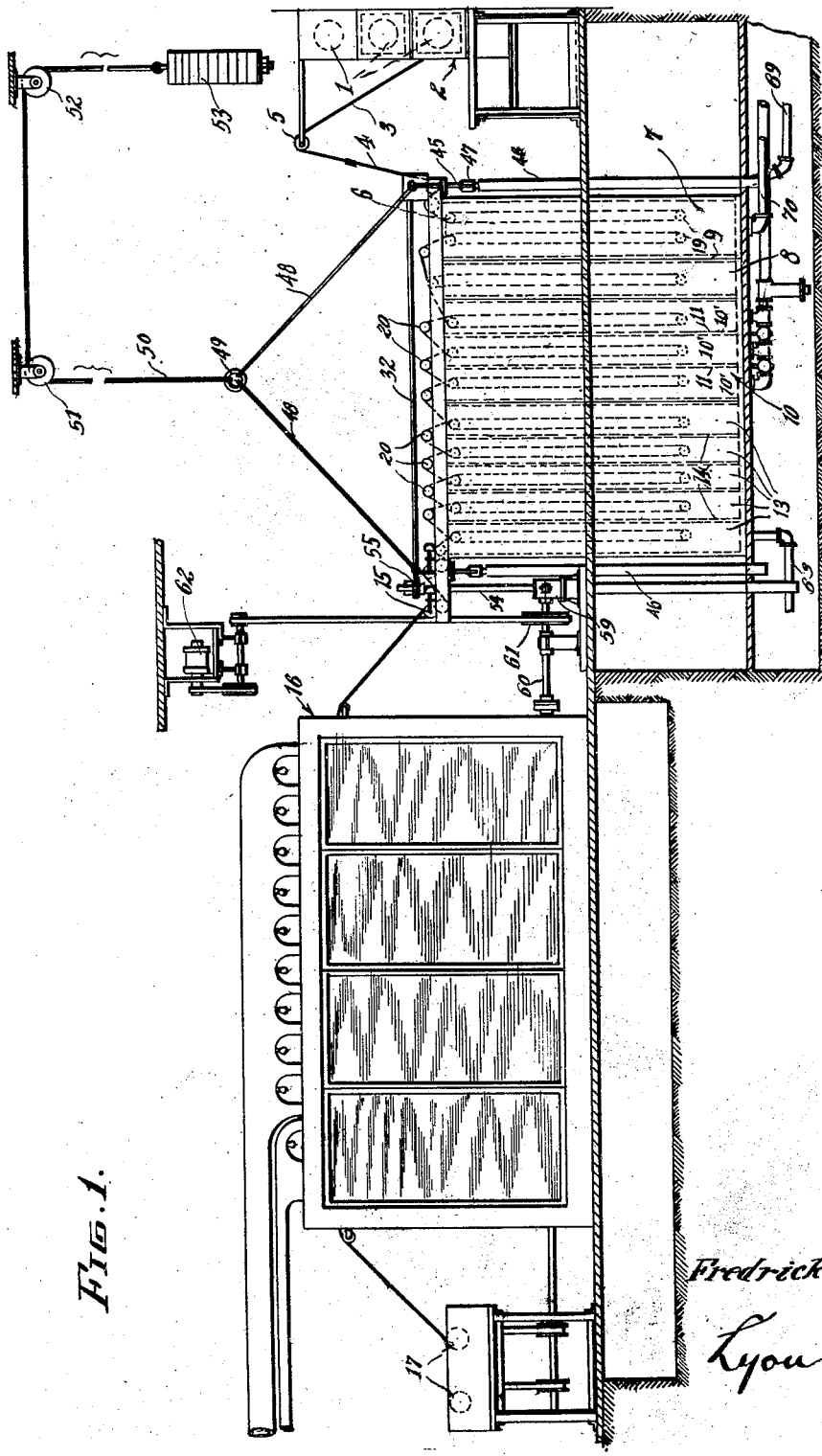
Figure 1 is a side elevation showing a photographic film developing apparatus embodying this invention, and illustrating a manner of threading the film tape through the apparatus as well as a means of suspending the film carriages in the liquid tanks.

Film reels 1 are held in a suitable carriage 2, on which reels 1 the film tape 3, to be treated or developed and dried, is wound. A thread film 4 is threaded through the entire apparatus, to the end of which film 4 the film 3 is secured in any well known manner. The film tape 3 first passes over a roller 5 to position the film.

From the roller 5 the film 3 is threaded over the first of the upper rollers 6 in the developing tank 7, and around the lower rollers 19, as illustrated in Figure 2, in which tank 7 the film is developed. The film 3 is then rinsed free of the developing solution in a rinsing tank 8, which tank 8 is separated from the tank 7 by a partition 9. The film tape 3 then travels to a fixing tank 10, which tank 10 may be divided into separate tanks 10' by partitions 11. Leaving the fixing tank 10' the film is carried to a series of washing tanks 13, which tanks 13 are preferably separated by the partitions 14.

The film, thoroughly washed, then passes to the wringers 15 by means of which the surface water carried on and by the film tape 3 is thoroughly removed. From the wringers 15 the film tape 3 is driven to the drier 16 and dried. The film tape 3 is finally wound on take-up reels 17 and is ready for projection in a motion picture projecting machine.

To drive the film tape 3 through the apparatus I provide the following arrangement of parts:

The film tape 3 leaving the positioning roller 5 is trained over a pair of idle rollers 18 and over the endmost idle roller 6, the film tape passing then down over one of the endmost driven rollers 19, then back over the second idle roller 6, then over the second driven roller 19, and so on, so that said film tape 3 is trained substantially helically from end to end of said first set of idle and driven rollers 6 and 19. After being trained over the last idle roller 6, the film tape is trained over the pressure idler 20, which idler 20 tends to compensate for the elongation of the tape 3. The film tape 3, after being trained over the last idle roller 6 of the first set, is then trained over the first idle roller 6 in the next tank at the same end of the tank, and the driven rollers 19 of the second set, so that the said film tape will pass alternately in opposite directions helically over the several sets of rollers 6 and 19, and thus practically zigzags through the apparatus from end to end thereof.

The idle rollers 6 are loosely journaled on the rods 21 in suitable bearings 23, which rods 21 are secured at their respective ends in suitable brackets 22; the side flanges 24 and the end collars 25 being adapted to properly space the rollers 6 on the rods 21. The flanges 24 also act as guides for the film tape 3, causing the film tape 3 to be properly positioned on the rollers 6. The rollers 19 are keyed or otherwise suitably secured to the shafts 26; the rollers 19 have a raised edge portion 27 and depressed central portions 28 and have central supporting rims 29, these rollers being so adapted to allow the solution to get behind the film tape on these rollers 19 to release any capillary attraction between the film and the rollers and to more efficiently impart their motion to the film tape 3.

The shafts 26 are driven in any suitable manner and are all driven at the same rate of speed, the driving means shown comprising a worm 30, driven in each case from a vertical shaft 31 extending downward from the top of the tanks. A horizontal shaft 32 extends the length of the treating tanks 7, 8, 10 and 13, and drives each of the shafts 31 by means of a gear arrangement 33, shown in Figure 3. The shaft 32 is journaled in bearings 34, which bearings 34 are secured in brackets 35 resting on the edge 36 of the liquid tanks. Each bracket is formed in part by the angle iron 37, which iron runs longitudinally the length of the tanks 7, 8, 10 and 13.

A pair of rods 38 is secured at their upper ends to the said angle iron 37 and form a means of carrying the lower brackets 39, holding each shaft 26 in its respective position in the liquid tanks 7, 8, 10 and 13.

On the opposite side of the liquid tanks a second angle iron 40 is positioned, and to which angle iron 40 a second pair of rods 41 is secured, the rods 41 holding brackets 42 suspended in the respective tanks and holding the opposite ends of the driven shafts 26. The shafts 26, it is understood, are journaled in suitable bearings 43, which bearings are held in the brackets 39 and 42, respectively. The rods 38 and 41 are held in spaced relation by any suitable means, such as the spacing members 44 shown in Figure 3. These carriages are, by some such arrangement as heretofore described, held in suspension in the respective liquid tanks.

The angle irons 37 and 40 are secured to the shafts 45, which shafts 45 are adapted to slide in suitable housings 46. The housings 46 act as guides to position the carriages in the liquid tanks. The rods 45 are fitted with stops 47, the stops 47 arresting the descent of the carriages into the tanks.

To raise these film carriages from the tanks I have shown the following preferred means:

To the ends of the angle irons 37 and 40 cables 48 are secured and extend upward, and are secured at the uppermost ends to a ring 49. A cable 50 is secured to the ring 49 and passes through a pulley 51, which pulley 51 is secured to the ceiling of the room in which the apparatus is installed, preferably directly above the center of the liquid tanks. A second pulley 52 is secured to the ceiling in any desired place; the cable 50 passing through the second pulley 52 is secured to a weight 53, the weight 53 being just sufficient to balance the weight of the film carriage in the liquid tanks. By this means the carriage may be elevated from the liquid tanks by exerting a pressure on the cable 50 in excess of the weights, so that the carriage may be repaired, or the film tape, when broken, patched so that it may proceed through the apparatus.

The shaft 32 is connected to any suitable source of power in some such manner as will now be described.

The shaft 32 is connected to a shaft 54 by means of suitable gearing 55, the shaft 54 having a keyway 56 extending practically its entire length. A beveled gear 57 is keyed to this shaft 54 in such a manner as to allow the shaft 54 to slide through the gear 57 and to be driven by the gear 57 at any point along its entire length. The beveled gear 57 is adapted to mesh with a beveled gear 58, both of which gears 57 and 58 are held in position in a suitable carriage bracket 59. The gear 58 is keyed to the shaft 60, which shaft 60 is adapted to transmit power to the drier as well as the developer end of this apparatus. Keyed to the shaft 60 is a belt pulley 61, which belt pulley is connected to any suitable source of power, such as that shown at 62 in Figure 1.

To wash the film, I have discovered that a counter-current flow of water through the washing and rinsing tanks is most desirable, as hereinafter described.

Water enters the last washing tank 13ª at a point near the bottom, as shown at 63; the water flows upwards in this tank 13ª to a point near the top, where it overflows through the pipe 64 to the bottom of the tank 13ᵇ, overrunning from the tank 13ᵇ through the pipe 65 to the tank 13ᶜ, overflowing from the tank 13ᶜ through a pipe 66 to the tank 13ᵈ, and hence from the tank 13ᵈ through the pipe 67 to the tank 13ᵉ, from which tank 13ᵉ the water overflows through a pipe 68 to the rinsing tank 8. The water there overflows from the rinsing tank 8 and is led through a pipe 69 to the sewer or is otherwise disposed of.

The developing tank 7 is fitted with a discharge pipe 70 so that the developing solution may be drained therefrom and analyzed or replaced, as desired.

Likewise, a drain pipe is fitted to the fixing tank 10' for a like purpose.

The rollers of each unit progressing from the developing tank through the rinsing, fixing, and to and through the last washing tank are made progressively smaller in pitch diameter; and I have discovered that a change of pitch diameter of approximately .005 of an inch between the rollers of each carriage unit provides an apparatus in and through which the film tape will be efficiently and effectually driven.

The rollers 19 are preferably made of a hard wood, such as lignum vitæ wood, or of any other suitable form of a non-electrolytic material, and are so degraded in size for the additional purpose of compensating for any increase in diameter due to the swelling of the wood when subjected to the action of the liquids. This decreasing of diameters of the rollers of each unit insures that the film tape will at no time be subject to a great strain or tension and that sufficient slack will at all times be present to just enable the bottom rollers to frictionally engage to the film tape to drive the same through the apparatus and is in addition to the natural increase in length of the film tape when so wet.

Having fully described a preferred embodiment of this invention, it is to be understood that the construction as set forth may be varied in detail without departing from the spirit of the appended claims.

I claim:—

1. In a photographic film treating apparatus, the combination of a container, means to divide the container into separate developing, rinsing, fixing and washing tanks, a series of sets of idle rollers, a series of sets of driven rollers, said sets of driven rollers being of progressively decreasing diameter from the first set.

2. In a photographic film treating apparatus, the combination of a tank, a series of shafts secured within the top of the tank, a series of rollers journalled on the shafts, a series of sets of shafts within the tank rollers keyed to the latter shaft, means for driving the shaft to which the said rollers are keyed causing the film to travel through the apparatus, the set of rollers of each shaft having smaller pitch diameters proceeding toward the film entrance end of the apparatus.

3. In a photographic film treating apparatus, the combination of a tank divided into separate developing, rinsing, fixing and washing chambers, a shaft carrying rollers in the upper portion of each separate chamber, a shaft carrying rollers in the lower portion of each tank over which rollers a film tape is trained, means to drive one of said shafts so that the film tape is frictionally driven through the said chambers, and the set of driven rollers being of decreasing pitch diameter from the said developing chamber to the washing machine.

4. Photographic film treating apparatus comprising a film carriage having a plurality of upper shafts, rollers on the upper shafts, a plurality of lower shafts, rollers on the lower shafts, means for driving the rollers on one of said shafts, means for compensating for the change of length of the film when treated, comprising a change of pitch diameter of the rollers on the shafts, said pitch diameter of the rollers being progressively smaller proceeding through the apparatus from the film tape entrance.

5. Photographic film treating apparatus comprising a container, film carriage units suspended within the container, each unit comprising an upper shaft, rollers journaled on the upper shaft, and a lower shaft, rollers keyed to the lower shaft, the pitch diameter of the rollers being smaller progressing through the machine and means for driving the lower shafts.

6. In a photographic film treating apparatus, the combination of a container, film carriage units suspended within the container, means for raising the carriage units from the container, each of said carriage units comprising an upper shaft, rollers journaled on the shaft, a lower shaft, rollers keyed to the lower shaft, and means to drive a set of rollers, the pitch diameter of the rollers being progressively smaller proceeding through the apparatus from the film entrance end.

7. In a photographic film treating apparatus, the combination of a container, means dividing the container into separate developing, rinsing, fixing and washing tanks, means to cause water to flow through the washing tanks and hence through the rinsing tank, film carriage units suspended within the separate tanks, each of said units comprising upper and lower shafts, film rollers on said shafts said film rollers of each unit having progressively smaller pitch diameter from the film entrance and means for driving the rollers on one of said shafts.

8. In a photographic film treating apparatus the combination of a tank divided into separate developing, rinsing, fixing and washing chambers, a film carriage unit mounted in each of the said chambers, each of which film carriage units including an upper shaft and a lower shaft, rollers mounted on each on said shafts, means for driving the rollers on one of said shafts so that the film is frictionally driven over the carriage, an idle roller mounted above the carriage and over which the film tape is trained, and the said driven rollers being of decreasing diameter from the said developing chamber.

9. In an apparatus of the class described, the combination of a container, means dividing the container into separate developing, rinsing, fixing and washing tanks, film carriage units suspended with the separate tanks, each of which units comprise upper and lower shafts, film rollers on the said shafts, the rollers on the lower shaft being constructed of a non-electrolytic material, and means for driving the film tape over the said rollers.

Signed at Los Angeles, California, this 1st day of February, 1924.

FREDRICK B. THOMPSON.